United States Patent
Krakowski et al.

(10) Patent No.: US 10,654,538 B2
(45) Date of Patent: May 19, 2020

(54) ADJUSTABLE SEAT CUSHION

(71) Applicants: Eugene Krakowski, Brooklyn, NY (US); Leah Krakowski, Brooklyn, NY (US); Steven Krakowski, Brooklyn, NY (US)

(72) Inventors: Eugene Krakowski, Brooklyn, NY (US); Leah Krakowski, Brooklyn, NY (US); Steven Krakowski, Brooklyn, NY (US)

(*) Notice: Subject to any disclaimer, the term of this patent is extended or adjusted under 35 U.S.C. 154(b) by 0 days.

(21) Appl. No.: 16/285,435

(22) Filed: Feb. 26, 2019

(65) Prior Publication Data

US 2019/0263465 A1 Aug. 29, 2019

Related U.S. Application Data

(60) Provisional application No. 62/635,785, filed on Feb. 27, 2018.

(51) Int. Cl.
| | | |
|---|---|---|
| *B62J 1/00* | (2006.01) | |
| *B62J 1/08* | (2006.01) | |
| *B62J 1/10* | (2006.01) | |
| *A47C 7/14* | (2006.01) | |

(52) U.S. Cl.
CPC ............... *B62J 1/10* (2013.01); *A47C 7/144* (2018.08)

(58) Field of Classification Search
CPC ................................... B62J 1/10; A47C 7/144
USPC ................. 297/195.1–215.16, 284.3, 452.63
See application file for complete search history.

(56) References Cited

U.S. PATENT DOCUMENTS

| | | | | |
|---|---|---|---|---|
| 2,445,158 | A * | 7/1948 | Sparhawk | A61G 7/0573 5/611 |
| 4,962,943 | A | 10/1990 | Lin | |
| 4,969,684 | A * | 11/1990 | Zarotti | A47C 7/467 297/284.3 X |
| 5,626,555 | A * | 5/1997 | Di Blasi | A47C 21/006 601/98 |
| 6,014,784 | A | 1/2000 | Taylor et al. | |
| 6,129,419 | A | 10/2000 | Neale | |
| 6,217,121 | B1 * | 4/2001 | Mollet | A47C 23/002 297/452.21 |
| 6,557,937 | B1 * | 5/2003 | Shah | A47C 7/028 297/284.3 |
| 6,619,739 | B2 | 9/2003 | McMillen | |
| 6,823,549 | B1 | 11/2004 | Hampton et al. | |
| 6,824,221 | B1 * | 11/2004 | Tiffany, III | A47C 4/022 297/452.63 X |
| 7,409,735 | B2 * | 8/2008 | Kramer | A47C 27/082 5/713 |

(Continued)

*Primary Examiner* — Rodney B White
(74) *Attorney, Agent, or Firm* — Boudwin Intellectual Property

(57) ABSTRACT

An adjustable seat cushion. The adjustable seat cushion provides a frame defining an interface. The interface receives a plurality of dynamic supports and a plurality of static supports. The plurality of dynamic supports is disposed alternatingly between the plurality of static supports upon the interface. A handle is in operable connection with the plurality of dynamic supports. Rotation of the handle in a first direction elevates the plurality of dynamic supports relative to the plurality of static supports. Rotation of the handle in a second direction depresses the plurality of dynamic supports relative to the plurality of static supports.

9 Claims, 2 Drawing Sheets

(56) References Cited

U.S. PATENT DOCUMENTS

| | | | |
|---|---|---|---|
| 8,011,044 B1* | 9/2011 | Jones | A61G 5/10 |
| | | | 297/284.3 |
| 9,422,019 B2* | 8/2016 | Stuckey | B62J 1/10 |
| 2019/0183257 A1* | 6/2019 | Arzanpour | A47C 7/142 |

* cited by examiner

ADJUSTABLE SEAT CUSHION

CROSS REFERENCE TO RELATED APPLICATIONS

This application claims the benefit of U.S. Provisional Application No. 62/635,785 filed on Feb. 27, 2018. The above identified patent application is herein incorporated by reference in its entirety to provide continuity of disclosure.

BACKGROUND OF THE INVENTION

The present invention relates to an adjustable seat cushion. Specifically, the present invention relates to an adjustable seat cushion providing a handle for the user to adjust the relative positioning of a plurality of dynamic supports to a plurality of static supports.

Many individuals must sit to engage in certain activities. However, when an individual sits for a prolonged period of time, continuous pressure is applied to the individual's backside and lower spine. Overtime, this pressure can lead to soreness of variable intensity, as well as severe pain in some cases. In the short-term, a person may attempt to shift his or her weight around in an effort to get comfortable. Additionally, an individual may step away from the seat entirely to reduce pressure and to relieve pain. Cyclists and motorcyclists, specifically, may be in a seat for a prolonged amount of time, in a way where pressure is consistently applied to the backside or spine. Therefore, there is a defined need in the known art for a comfortable and dynamic seat that allows for a user to relieve pain and discomfort easily and effectively.

SUMMARY OF THE INVENTION

In view of the foregoing disadvantages inherent in the known types of adjustable seats now present in the prior art, the present invention provides an adjustable seat cushion, wherein the same can be utilized for providing convenience for the user when providing a seating surface for an individual.

The present system comprises an adjustable seat cushion. The adjustable seat cushion provides a frame defining an interface. The interface receives a plurality of dynamic supports and a plurality of static supports. The plurality of dynamic supports is disposed alternatingly between the plurality of static supports upon the interface. A handle is in operable connection with the plurality of dynamic supports. Rotation of the handle in a first direction elevates the plurality of dynamic supports relative to the plurality of static supports. Rotation of the handle in a second direction depresses the plurality of dynamic supports relative to the plurality of static supports.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
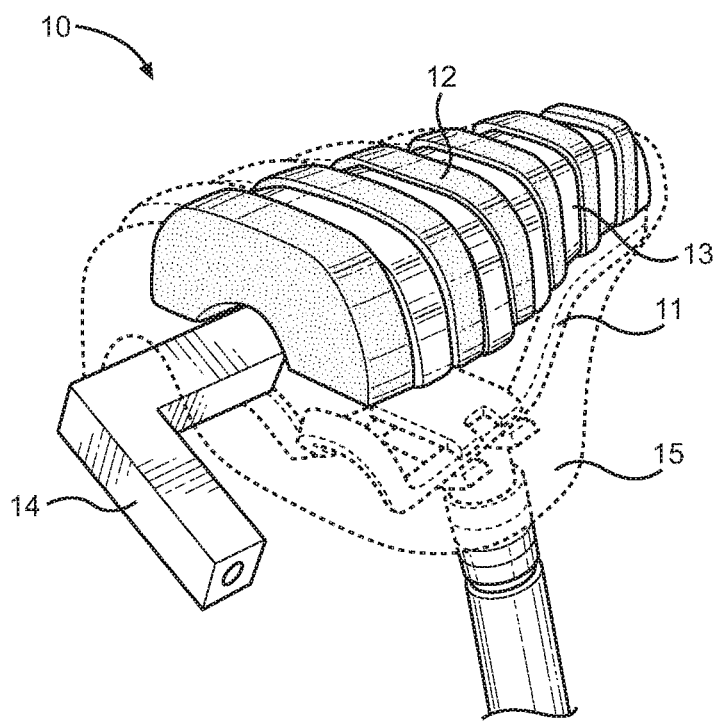
FIG. 1 shows a perspective view of an embodiment of the adjustable seat cushion.

Reference is made herein to the attached drawings. Like reference numerals are used throughout the drawings to depict like or similar elements of the adjustable seat cushion. The figures are intended for representative purposes only and should not be considered to be limiting in any respect.

Referring now to FIG. 1, there is shown a perspective view of an embodiment of the adjustable seat cushion. The adjustable seat cushion 10 comprises a frame 11 defining an interface. In the illustrated embodiment, the frame 11 is configured to mount upon a bicycle. Specifically, the frame 11 comprises a pair of symmetrically oriented rods with a brace defined therebetween. The pair of symmetrically oriented rods define a greater distance therebetween at a rear portion each thereof than at a tip portion thereof. As such, the frame 11 defines a seating surface that is wider at the rear to provide support to a user and narrower at the tip to provide mobility for the legs of the user.

A plurality of static supports 13 is in operable connection with the frame 11. In the illustrated embodiment, the plurality of static supports 13 are mounted upon the frame 11 such that they are unmovable. The plurality of static supports 13 are made of any suitable material for receiving a user thereon. In one embodiment, the plurality of static supports 13 is made of a foam material, such that additional comfort is provided to a user seated thereon. In the illustrated embodiment, each static support of the plurality of static supports 13 defines an identical width. As such, uniform pressure is absorbed by each static support of the plurality of static supports 13 when force is exerted by the user sitting thereon.

A plurality of dynamic supports 12 is in operable connection with the frame 11. In the illustrated embodiment, the plurality of dynamic supports 12 are mounted upon the frame 11, such that they are movable relative to the plurality of static supports 13. Specifically, each dynamic support of the plurality of dynamic supports 12 is disposed between a pair of static supports of the plurality of static supports 13. As such, the dynamic supports 12 are evenly disposed across the entirety of the frame 11. The plurality of dynamic supports 12 are made of any suitable material for providing comfort to the user when the user is sitting on the adjustable seat cushion 10. In one embodiment, the plurality of dynamic supports 12 are made of a foam material, such as to increase comfort provided to the user. In the illustrated embodiment, each dynamic support of the plurality of dynamic supports 12 comprises an identical width such that uniform pressure is exerted upon each dynamic support.

A handle 14 is in operable connection with the plurality of dynamic supports 12. The handle 14 is freely rotatable. In the illustrated embodiment, the handle 14 is made of a rigid material such that the handle 14 is manipulatable via engagement by the Furthermore, in the illustrated embodiment, the handle 14 is bent such that a first portion of the handle 14 forms a right angle with a second portion of the handle 14. As such, the handle 14 is rendered easier to manipulate.

In one embodiment, the adjustable seat cushion 10 further comprises a cover 15 attached to the frame 11 and disposed over a top of the plurality of dynamic supports 12 and the plurality of static supports 13. The cover 15 is configured to fit over the plurality of dynamic supports 12 and the plurality of static supports 13, such that the user does not sit directly upon the plurality of dynamic supports 12 and the plurality of static supports 13. Additionally, the cover 15 is configured to prevent dust and debris from gathering between the plurality of dynamic supports 12 and the plurality of static supports 13. In an alternate embodiment, the cover 15 comprises a padding therein, such that increased comfort is provided to a user.

In a further embodiment, the plurality of static supports 13 is made of a first material and the plurality of dynamic supports 12 is made of a second material. The first material is distinct from the second material, such that the first material has different properties from the second material. In an additional embodiment, the first material comprises a greater density relative to the second material. As such, the plurality of dynamic supports 12 will act as a cushion when elevated, providing enhanced comfort, while the plurality of static supports 13 will provide stability to the adjustable seat cushion.

In another embodiment, a shape of each static support of the plurality of static supports 13 is identical. In yet another embodiment, a shape of each dynamic support of the plurality of dynamic supports 12 is identical. Additionally, the shape of each static support of the plurality of static supports 13 may be identical to the shape of each dynamic support of the plurality of dynamic supports 12. In the illustrated embodiment, the plurality of dynamic supports 12 and the plurality of static supports 13 taper in width from a first end 17 of the frame 11 to a second end 18 of the frame 11.

Figure 2:
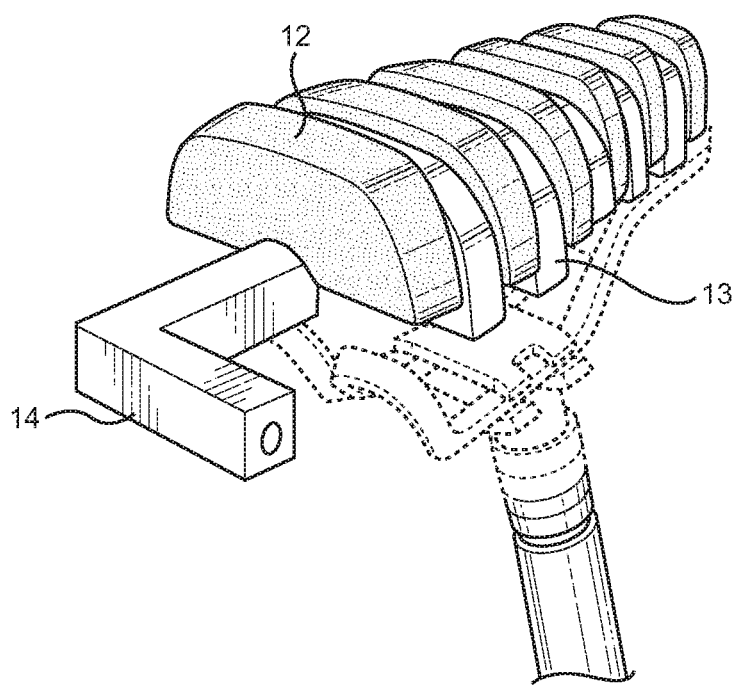
FIG. 2 shows a perspective view of an embodiment of the adjustable seat cushion.

Referring now to FIG. 2, there is shown a perspective view of an embodiment of the adjustable seat cushion. Rotation of the handle 14 in a first direction elevates the plurality of dynamic supports 12 relative to the plurality of static supports 13. When the plurality of dynamic supports 12 are made of a material having a lesser density than the material of the plurality of static supports 13, the adjustable seat cushion is rendered to feel softer to the user when the plurality of dynamic supports 13 are elevated. In the illustrated embodiment, the plurality of dynamic supports 13 is elevated relative to the plurality of static supports 13 when the handle 14 is turned in a counter-clockwise direction.

Figure 3:
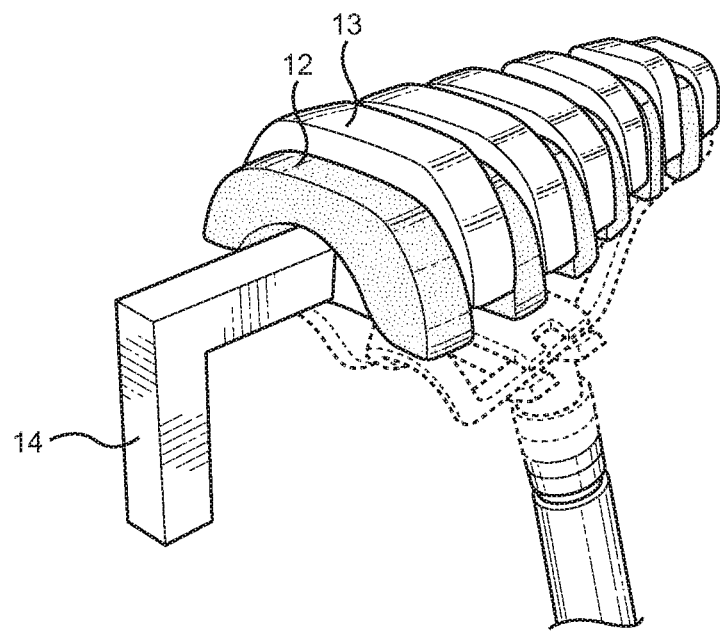
FIG. 3 shows a perspective view of an embodiment of the adjustable seat cushion.

Referring now to FIG. 3, there is shown a perspective view of an embodiment of the adjustable seat cushion. Rotation of the handle 14 in a second direction depresses the plurality of dynamic supports 12 relative to the plurality of static supports 13. When the plurality of dynamic supports 12 are made of a material having a lesser density than the material of the plurality of static supports 13, the adjustable seat cushion is rendered to feel firmer when the plurality of dynamic supports 12 are depressed. In the illustrated embodiment, the plurality of dynamic supports 12 is depressed relative to the plurality of static supports 13 when the handle 14 is turned in a clockwise direction.

Figure 4:
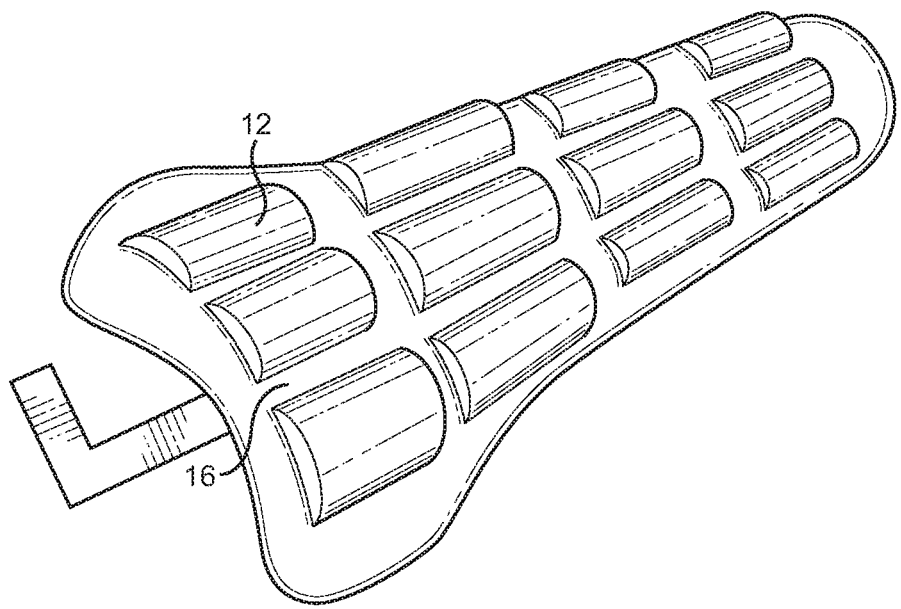
FIG. 4 shows a perspective view of an alternate embodiment of the adjustable seat cushion.

Referring now to FIG. 4, there is shown a perspective view of an alternate embodiment of the adjustable seat cushion. In the illustrated embodiment, a plurality of perpendicularly oriented braces 16 connects the plurality of static supports 13. A plurality of indents corresponding to the plurality of perpendicularly oriented braces 16 are disposed within the plurality of dynamic supports 12.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An adjustable seat cushion, comprising:
   a frame defining an interface;
   a plurality of dynamic supports in operable connection with the frame;
   a plurality of static supports in operable connection with the frame;
   a handle in operable connection with the plurality of dynamic supports;
   wherein the handle is freely rotatable;
   wherein rotation of the handle in a first direction elevates the plurality of dynamic supports relative to the plurality of static supports; and
   wherein rotation of the handle in a second direction depresses the plurality of dynamic supports relative to the plurality of static supports.

2. The adjustable seat cushion of claim 1, further comprising a cover attached to the frame disposed over the plurality of dynamic supports and the plurality of static supports.

3. The adjustable seat cushion of claim 1, wherein:
   a plurality of perpendicularly oriented braces connect the plurality of static supports;
   wherein a plurality of indents corresponding to the plurality of perpendicularly oriented braces are disposed in the plurality of dynamic supports.

4. The adjustable seat cushion of claim 1, wherein the plurality of static supports is made of a first material and the plurality of dynamic supports is made of a second material, wherein the first material is distinct from the second material.

5. The adjustable seat cushion of claim 4, wherein the first material comprises a greater density relative to the second material.

6. The adjustable seat cushion of claim 1, wherein a shape of each dynamic support of the plurality of dynamic supports is identical.

7. The adjustable seat cushion of claim 1, wherein a shape of each static support of the plurality of static supports is identical.

8. The adjustable seat cushion of claim 1, wherein a shape of each static support of the plurality of static supports is identical to a shape of each dynamic support of the plurality of dynamic supports.

9. The adjustable seat cushion of claim 1, wherein the frame, the plurality of dynamic supports and the plurality of static supports taper in width from a first end of the frame to a second end of the frame.

* * * * *